United States Patent [19]

Zamiara

[11] 4,339,846
[45] Jul. 20, 1982

[54] SAUSAGE COILING MACHINE

[75] Inventor: Anthony W. Zamiara, Spencerport, N.Y.

[73] Assignee: Maplecrest Foods, Inc., Rochester, N.Y.

[21] Appl. No.: 161,403

[22] Filed: Jun. 20, 1980

[51] Int. Cl.³ ............................................. A22C 15/00
[52] U.S. Cl. ..................................... 17/1 R; 17/44.4; 242/53; 242/110.1; 242/110.3
[58] Field of Search .................. 17/33, 44, 44.2, 44.4; 242/110, 110.1, 53, 110.3

[56] References Cited

U.S. PATENT DOCUMENTS

| | | | |
|---|---|---|---|
| 1,629,655 | 5/1927 | Curry | 17/44.4 |
| 2,087,673 | 7/1937 | Lisberg | 17/34 |
| 2,282,666 | 5/1942 | McCue | 17/45 |
| 2,308,740 | 1/1943 | Bogner | 17/44.4 |
| 2,592,939 | 4/1952 | Miller | 17/34 |
| 2,697,850 | 12/1954 | Cross | 17/34 |
| 2,780,831 | 2/1957 | Harman | 17/34 |
| 2,781,988 | 2/1957 | Peschke | 242/113 |
| 2,995,312 | 8/1961 | Nagel | 242/54 |
| 3,115,668 | 12/1963 | Townsend | 17/33 |
| 3,191,222 | 6/1965 | Townsend | 17/33 |
| 3,289,966 | 12/1966 | Richel | 242/110.1 X |
| 3,302,902 | 2/1967 | Brinkman | 242/110.1 |
| 3,421,712 | 1/1969 | Scroggie et al. | 242/110.1 |
| 3,533,495 | 10/1970 | Wallace | 198/20 |
| 3,918,659 | 11/1975 | Padgett, Jr. | 242/110.1 |
| 4,021,885 | 5/1977 | Muller | 17/33 |
| 4,091,505 | 5/1978 | Muller et al. | 17/33 |

Primary Examiner—Willie G. Abercrombie
Attorney, Agent, or Firm—Martin P. Hoffman; Mitchell B. Wasson

[57] ABSTRACT

A motor driven machine for compactly coiling a chain of sausages prior to delivering the sausages to a smoking room. The machine comprises an arcuate first arm and a second, channel-like arcuate arm; an elongated drive shaft is disposed within the second arm. A pneumatic piston joins the arms together, and conduits deliver pneumatic pressure to the piston from the bore of the drive shaft. One end of a rope of sausages is clamped to one arm, and a smoke stick is temporarily retained in the other arm. The piston is then pressurized to force the arms apart, and the drive shaft and the arms are rotated rapidly, as a unit, to form a coil of sausage about the expanded arms. When the coil reaches the desired length, the piston is then retracted so that the arms are drawn toward each other, and the smoke stick is removed with the sausages depending therefrom for processing.

8 Claims, 5 Drawing Figures

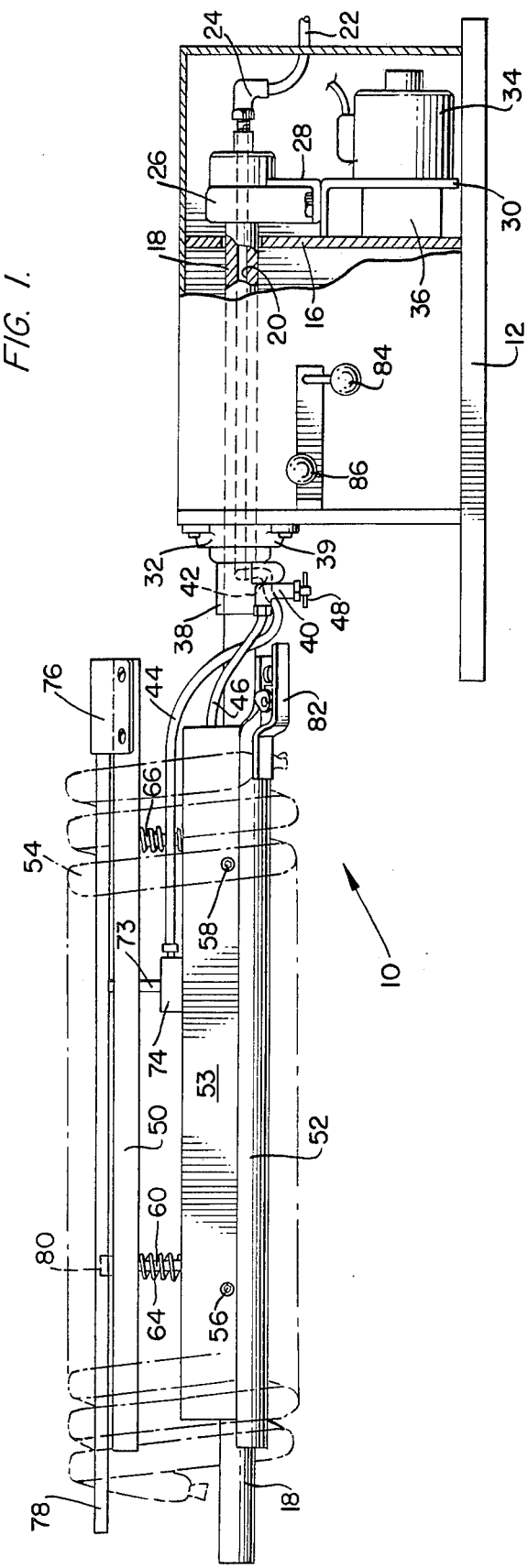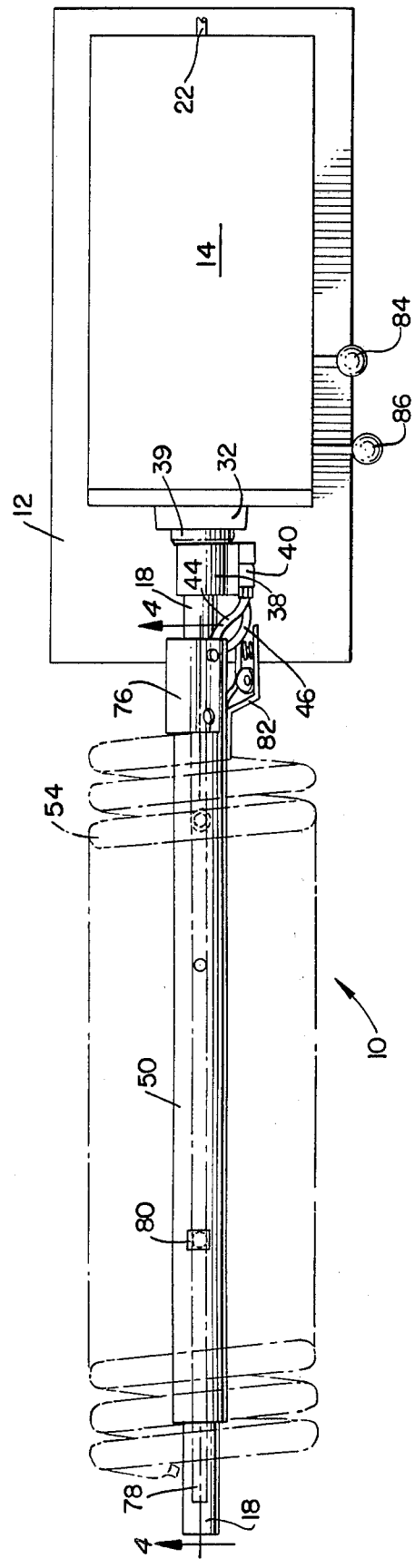

SAUSAGE COILING MACHINE

FIELD OF THE INVENTION

The present invention relates to a versatile high speed machine for coiling ropes of sausages about a smoke stick, such machine being adjustable to coil different lengths of sausages.

BACKGROUND OF THE INVENTION

Numerous attempts have been made over the years to devise apparatus that will facilitate the formation of a rope of sausages about a smoke stick on a high speed, production line basis. The smoke stick, with its ropes, or festoons of sausages, is removed from the apparatus for further processing in a smoke room in a meat processing plant. In view of the huge quantities of sausages, and the diverse types of such product, a high speed, sanitary and efficient apparatus for coiling sausages is assured of significant commercial acceptance.

U.S. Pat. No. 2,087,673, granted July 20, 1937 to C. Lisberg, discloses a sausage coiling machine employing a collapsible reel including toggle arms 24, 33 and spring 37 for biasing the arms away from central shaft 19. When detent 47 is released, the spring expands and the winding bars 30, 46 collapse inwardly toward shaft 19, as shown in FIG. 1. A smoke stick 27 is secured to one of the winding bars.

U.S. Pat. No. 2,995,312, granted Aug. 8, 1961 to Erwin Nagel, also discloses a sausage coiling machine employing a collapsible reel. A sausage guide 22 is slidably supported upon bars 20, 21 and feeds the sausage to the smoke stick 68 retained on the reel, as shown in FIG. 2.

U.S. Pat. No. 2,781,988, granted Feb. 19, 1957 to Carl H. Peschke, discloses a sausage coiling machine utilizing a reel comprising a pair of parallel rods 4, 4a, equally and oppositely spaced from the reel axis, and a pair of supports 8, 12 for the rod extremities. One of the rods is pivotally mounted on one of the supports, and has a latch connection to the other, whereby the rod may be swung from its normal position to facilitate removal of a sausage coil from the reel. By virtue of slots 18 and headed bolts 17, the rods and their mountings may be adjusted to, and from, the axis of the reel so that a desired number of sausage links may extend between the two rods.

While the winding machine described in the Peschke patent possesses greater versatility for handling different sausages lengths than the collapsible reels, the adjustments are rather cumbersome and time consuming to effectuate. Also, the adjustments require manual adjustments, and this may present a sanitary problem since one is dealing with food products.

SUMMARY

Thus, with the shortcomings of the prior art clearly in mind, the instant sausage coiling machine envisions a readily adjustable, versatile machine that can handle diverse types of sausages and varying lengths thereof. Furthermore, the instant machine contemplates a double-acting, pneumatic piston that positively forces a pair of arcuate arms toward, and away, from each other; the sausage is coiled about a smoke stick retained by one of the arms as the arms are positively driven by a motor-driven, elongated central shaft. The throw of the piston can be precisely adjusted so that different lengths of sausages can effectively be coiled thereabout.

Furthermore, the instant sausage coiling machine utilizes a drive shaft that fits within one of the arcuate arms to form a compact coiler, for the arms and drive shaft rotate as a unit. The arms are normally urged apart by spaced resilient members, and the piston is disposed between the resilient members. The drive shaft has a hollow bore that delivers pneumatic pressure to the conduits that influence the operation of the piston. A collar and a coupling prevent the conduits from becoming tangled as the arcuate arms and drive shaft rotate as high speeds to coil the sausages.

The instant coiling machine eliminates the conventional practice of manually coiling rope sausage, with attendant economies of time and labor costs. The machine can work at a pace that is five times faster than the pace attainable by manually coiling the rope sausage or the like. Also, the instant machine can be adapted to automatically pre-count the number of loops of sausage wrapped about the smoke stick.

Numerous other advantages attributable to the instant, improved sausage coiling machine will become readily apparent to the skilled artisan when the ensuing description of the machine is construed in harmony with the attached drawings.

BRIEF DESCRIPTION OF THE DRAWINGS

FIG. 1 is a front elevational view of a sausage coiling machine constructed in accordance with the principles of this invention; a fragment of the machine casing is removed for the sake of clarity;

FIG. 2 is a top plan view of the sausage coiling machine of FIG. 1;

DESCRIPTION OF THE PREFERRED EMBODIMENT

Figure 3:
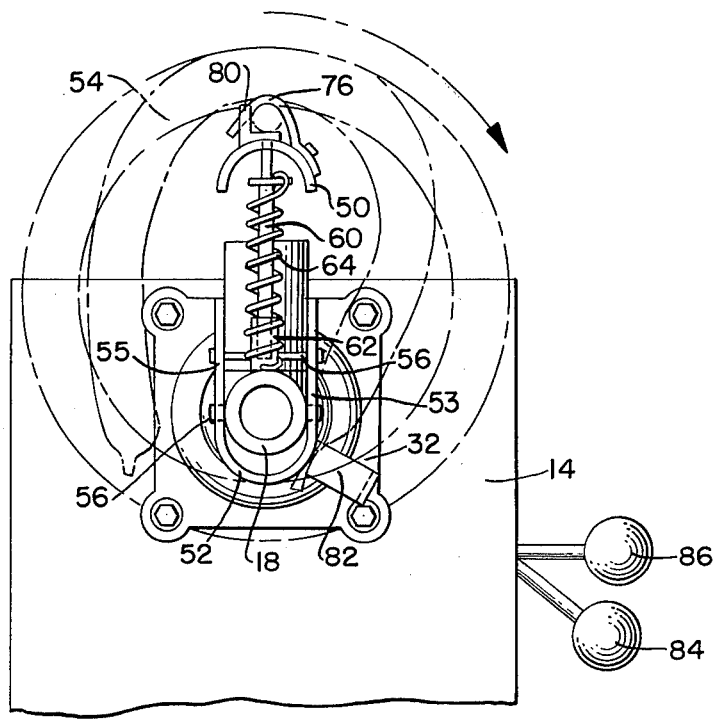
FIG. 3 is an end view of a fragment of the sausage coiling machine with sausages being wound upon the arcuate arms.

FIGS. 1 and 2 show a unique sausage coiling machine 10 including a base 12 with a rectangular casing 14 positioned thereon. A support wall 16 extends laterally across the interior of casing 14, and an elongated drive shaft 18 passes through an aperture in the wall and extends longitudinally through the casing. A longitudinal bore 20 extends through the interior of the shaft until the shaft exits casing 14, and the bore receives pneumatic pressure from a remote source (not shown) via conduit 22 and coupling 24. A support bell 26, which is secured to angle irons 28, 30, supports one end of drive shaft 18, while annular bearing member 32 supports the shaft 18 as same exits from the casing 14. The shaft 18 is rotated at high speeds by a small horsepower motor 34 that cooperates with a gear reducer 36 to deliver power to the shaft in a conventional manner. (Not shown).

A collar 38 is secured to the drive shaft 18 adjacent to spacer 39 and annular bearing members 32, and a pipe coupling 40 is secured in position by collar 38 by a plastic cable or other fastener. Flexible plastic conduit 42 extends between the hollow bore 20 in shaft 18 and the coupling 40; conduits 44 and 46 extend downstream of the bore but are in fluid communication therewith. An adjustable valve 48 can adjust the pneumatic flow between the bore 20 and the conduits.

FIG. 3, which is taken at the end of drive shaft 18 remote from the casing 14, depicts a first arcuate arm 50 and a second arcuate arm 52 about which the sausages 54 are to be coiled. The arms are made of stainless steel for sanitary reasons. As seen most clearly in FIGS. 1 and 3, the arcuate arms are not identical. Arm 50 is a shallow semi-circle, while arm 52 is a deeper, U-shaped channel when viewed in end elevation. The drive shaft 18 fits partially within arm 52. Spaced side walls 53, 55 are retained in opposite sides of arm 52, and bolts 56, 58 extend across the channel about the shaft 18 to secure the walls in fixed relationship to each other and to the arm 52. A first rod 60 depends from the underside of arm 50 toward an aligned receptacle 62 disposed on the upper surface of shaft 18. The rod 60 is urged away from receptacle 62 by coil spring 64, which encircles rod 60. The receptacle is deep enough to allow limited axial movement of rod 60 therewithin when the arms 50, 52 are forced toward each other.

Figure 4:
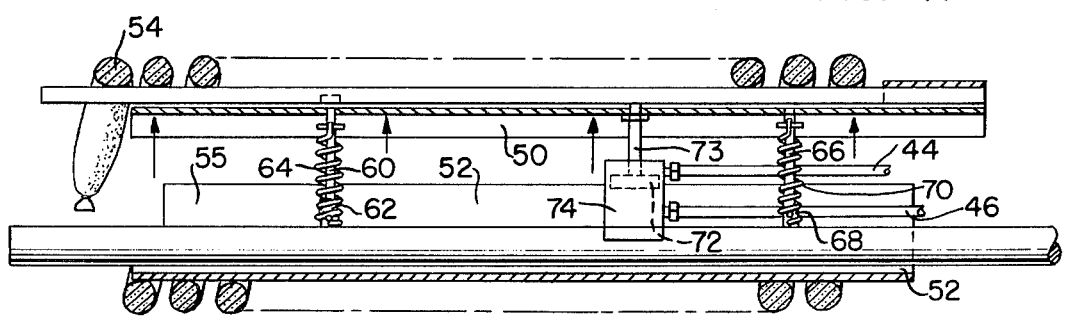
FIG. 4 is a vertical cross-sectional view of the arcuate arms, in extended position, with sausages wound thereupon, such view being taken along line 4—4 in FIG. 2 and in the direction indicated.
Figure 5:
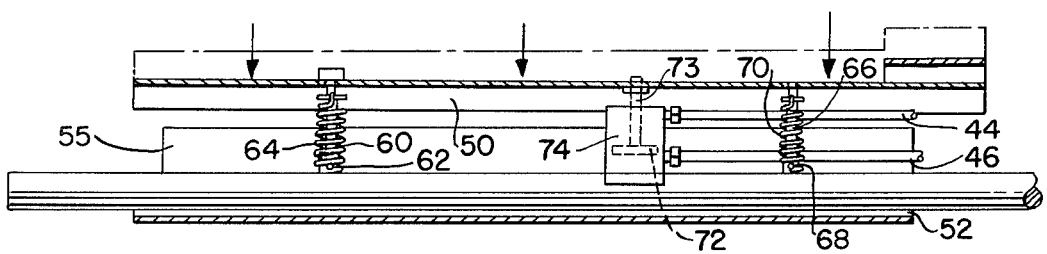
FIG. 5 is a view similar to FIG. 4, but showing the arcuate arms in retracted position with the sausages removed therefrom.

A second rod 66, spaced much closer to casing 14, also depends from the underside of arm 50 toward an aligned receptacle 68 disposed on the upper surface of shaft 18, as shown in FIGS. 4–5. The rod 66 is urged away from receptacle 68 by coil spring 70, which encircles rod 66. The receptacle is deep enough to allow limited axial movement of rod 66 therewithin when the arms 50, 52 are forced toward each other. A double acting pneumatic piston 72 and piston rod 73 that travel within housing 74 are situated intermediate the rods 60, 66 and their related receptacles. The housing is secured within the channel of arm 52 and the upper end of the piston rod is bolted, or otherwise joined, to arm 50. The first conduit 44 delivers pneumatic pressure to one face of the piston 72 and drives the piston rod 73 upwardly to overcome the bias of the springs 64, 70. The second conduit 46 delivers the pneumatic pressure within housing 74 to the opposite side of piston 72, and the piston is driven downwardly so that the piston rod 73 draws the arcuate arms 50, 52 together.

When viewed in side elevation, the piston 72 and piston rod 73 are situated before the midpoint of the arms since most of the weight of the sausages will be concentrated in this area. The arms 50, 52 are biased apart by springs 64, 70 at all times.

An arcuate bracket 76 overlies the end of arm 50 closest to casing 14 to receive one end of a smoke stick 78, and a guide 80 is situated above rod 60 on the upper surface of arm 52. The guide furnishes an intermediate support for the smoke stick 78. A spring loaded clamp 82 is located at the end of arm 52 closest to casing 14; the clamp holds one end of a chain of sausages firmly in place.

A first control lever 84 on casing 14 directs the pneumatic flow through bore 20 into conduit 46, which drives the plunger upwardly to force arms 50, 52 apart. A second control lever 86 on casing 14 directs the pneumatic flow through bore 20 into conduit 44, which drives the plunger downwardly to draw arms 50, 52 toward one another.

SUMMARY OF OPERATION

A smoke stick 78 is positioned within bracket 76 and atop guide 80 and is retained in fixed position atop arm 50. Rope sausage 54 is secured to arm 52 by clamp 82. Control lever 84 is moved to its actuated position, and pneumatic pressure from a remote source flows through bore 20 in drive shaft 18, through pipe coupling 40, and over conduit 46, to drive piston 72 within its housing 74 and move arm 50 further away from arm 52. When the diametric distance from the center of arm 50 to the center of arm 52 reaches the desired level, the motor 34 is energized and drive shaft 18 is rotated at a suitable rotational speed. The machine operator guides the sausage 54 onto the rotating arms 50, 52, for the arms and drive shaft rotate as a unit. When the sausage is completely coiled, the operator moves control lever 86 to its actuated position, so that the pressure flows through bore 20 in shaft 18, through pipe coupling 40, over conduit 44, to retract piston 72 within its housing 74 and move the arms 50, 52 toward each other. The springs 60, 66 establish the normal, unactuated position for the arms relative to one another. With the arms retracted the operator removes smoke stick 78 with the coiled sausage 54 depending therebelow, and places the loaded smoke stick on a cooking rack, or other support, for cooking, smoking or further processing.

It will be readily apparent from the foregoing description that numerous changes could be made to the instant coiling machine without departing from the inventive thrust of this invention. For example, the base 12 could be adjustable so that the casing 14 could be adjusted relative thereto; also, a counter could be added to the machine so that the revolutions of the arms 50, 52 could be counted and such information could be used to control the operation of piston 72. Also, while arm 52 and side walls 53, 55 are formed as separate members, it would be possible to form these members as an integral assembly.

Numerous other changes, modifications and revisions, will be apparent to the skilled artisan; consequently, the appended claims should be broadly construed in a fashion consistent with this invention, and should not be limited to their literal terms.

I claim:
1. A sausage coiling machine comprising:
 (a) an elongated drive shaft,
 (b) drive means for rotating said shaft,
 (c) a pair of spaced semi-arcuate arms,
 (d) means on one of said arms adapted to receive a smoke stick and means on the other arm adapted to receive an end of a chain of sausage,
 (e) at least one of said arms being secured about said drive shaft so that said arms and shaft rotate together,
 (f) connecting means extending between said arms for securing said arms together,
 (g) said connecting means including at least one rod depending from one of said arms and at least one receptacle located on the other one of said arms in alignment therewith, said rod being moveable within said receptacle to allow relative radial movement between said arms,
 (h) piston means secured between said pair of arms, and
 (i) pneumatic means connected to said piston means for pressurizing said piston means to move said rod within said receptacle, thereby adjusting the distance between said arms so that the radial distance between said arms is altered and the diameter of the rope of sausage to be coiled thereabout is adjusted.

2. A sausage coiling machine as defined in claim 1 wherein said connecting means comprises a pair of rods depending from one of said arms and a pair of receptacles located on the other arm in alignment therewith, said piston means being positioned between said pairs of rods and receptacles.

3. A sausage coiling machine as defined in claim 2 wherein biasing means are positioned about said rods to bias said arms apart.

4. A sausage coiling machine as defined in claim 1 wherein said pneumatic means includes a hollow bore defined within at least a portion of said drive shaft, a pipe coupling, and conduit means connecting the pipe coupling to said drive shaft.

5. A sausage coiling machine as defined in claim 1, wherein said first arm is a shallow semi-circular member, and said second arm is a deeper channel.

6. A sausage coiling machine as defined in claim 5, wherein a first side wall is positioned on one end free edge of said second arm, and a second side wall is positioned on the other free edge of said second arm, and fasteners for securing said side walls together so that said side walls and said second arm rotate as a unit.

7. A sausage coiling machine as defined in claim 1, wherein said piston means comprises a double acting piston and a piston rod moveable within a housing secured relative to one of said arms, and one end of said piston rod is secured to the other one of said arms.

8. A sausage coiling machine as defined in claim 1, wherein a collar is secured about said drive shaft to retain said pneumatic means in alignment as said drive shaft is rotated relative thereto.

* * * * *